(12) United States Patent
Axelrod et al.

(10) Patent No.: US 7,950,353 B2
(45) Date of Patent: May 31, 2011

(54) PET CHEW WITH RIGID HOLLOW BASE AND FABRIC ELEMENTS

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 61 days.

(21) Appl. No.: 11/277,711

(22) Filed: Mar. 28, 2006

(65) Prior Publication Data

US 2007/0227464 A1    Oct. 4, 2007

(51) Int. Cl.
*A01K 29/00*    (2006.01)

(52) U.S. Cl. ........................ 119/709; D30/160

(58) Field of Classification Search .......... 119/707–711, 119/702; D30/160; D21/576–658
See application file for complete search history.

(56) References Cited

U.S. PATENT DOCUMENTS

| | | | | |
|---|---|---|---|---|
| 1,534,964 A * | 4/1925 | Kahnweiler | ............ | 119/711 |
| 3,763,592 A * | 10/1973 | Den Ouden | ............ | 446/368 |
| 3,862,757 A * | 1/1975 | Craig, II | ............ | 473/575 |
| 4,245,426 A * | 1/1981 | Sullivan | ............ | 446/269 |
| 5,006,089 A * | 4/1991 | Lee | ............ | 446/267 |
| D318,502 S * | 7/1991 | Senitt | ............ | D21/603 |
| 5,092,272 A | 3/1992 | O'Rourke | | |
| 5,174,243 A | 12/1992 | O'Rourke | | |
| RE34,352 E * | 8/1993 | Markham et al. | ............ | 119/710 |
| 5,865,146 A * | 2/1999 | Markham | ............ | 119/707 |
| 6,112,703 A * | 9/2000 | Handelsman | ............ | 119/707 |
| 6,159,516 A | 12/2000 | Axelrod et al. | | |
| 6,178,922 B1 | 1/2001 | Denesuk et al. | | |
| 6,180,161 B1 | 1/2001 | Axelrod | | |
| 6,216,640 B1 | 4/2001 | Zelinger | | |
| 6,274,182 B1 | 8/2001 | Axelrod et al. | | |
| 6,360,693 B1 | 3/2002 | Long, III | | |
| 6,360,696 B1 * | 3/2002 | Arnold et al. | ............ | 119/710 |
| D481,073 S * | 10/2003 | Sawyer | ............ | D19/75 |
| 6,672,252 B2 | 1/2004 | Levin et al. | | |
| 6,672,253 B1 | 1/2004 | Viola | | |
| 6,688,258 B1 * | 2/2004 | Kolesar | ............ | 119/710 |
| 6,786,792 B2 * | 9/2004 | Ritchey | ............ | 446/71 |
| 6,821,538 B2 | 11/2004 | Axelrod et al. | | |
| 6,916,497 B2 | 7/2005 | Axelrod et al. | | |

(Continued)

FOREIGN PATENT DOCUMENTS

FR        2620041 A1 *    3/1989

OTHER PUBLICATIONS

MatWeb, Your Source for Materials Information, http://web.archive.org/web/20000301052924/http://www.matweb.com/[retrieved from internet: Sep. 25, 2007] Mar. 1, 2000.*

(Continued)

*Primary Examiner* — Rob Swiatek
*Assistant Examiner* — Kristen C Hayes
(74) *Attorney, Agent, or Firm* — Grossman, Tucker, Perreault & Pfleger, PLLC

(57) ABSTRACT

The present invention relates to a base including fabric elements extending from the base. The fabric elements may be positioned in a channel within the base. A locking relationship may be formed between the base and the fabric. Furthermore, the base may be provided so that the fabric elements may be removable from the base.

6 Claims, 15 Drawing Sheets

U.S. PATENT DOCUMENTS

| | | | |
|---|---|---|---|
| 6,981,471 B1 * | 1/2006 | Dubinins et al. | 119/710 |
| 7,063,044 B2 * | 6/2006 | Handelsman et al. | 119/709 |
| 7,207,294 B2 * | 4/2007 | Stasio | 119/707 |
| 2003/0079693 A1 * | 5/2003 | Jager | 119/707 |
| 2004/0200433 A1 * | 10/2004 | Oblack | 119/707 |
| 2005/0028754 A1 * | 2/2005 | Levan | 119/707 |
| 2005/0042339 A1 * | 2/2005 | Axelrod | 426/132 |
| 2005/0053756 A1 * | 3/2005 | Axelrod | 428/71 |
| 2005/0092258 A1 * | 5/2005 | Markham | 119/707 |
| 2005/0166865 A1 * | 8/2005 | Handelsman et al. | 119/709 |
| 2006/0090709 A1 * | 5/2006 | Lopus | 119/709 |
| 2006/0162673 A1 * | 7/2006 | Hurwitz | 119/709 |
| 2006/0225666 A1 * | 10/2006 | Axelrod | 119/709 |
| 2007/0099539 A1 * | 5/2007 | Fullmer | 446/369 |

OTHER PUBLICATIONS

Meffray Translation from USPTO, Sep. 2007.*

* cited by examiner

PET CHEW WITH RIGID HOLLOW BASE AND FABRIC ELEMENTS

FIELD OF INVENTION

The present invention relates to a chew toy for a pet that includes fabric extending from a base. The base may include a channel in which the fabric is located. The fabric may "lock" into the base to prevent the pet from removing the fabric from the base. Furthermore, the fabric may be removable from the base for replacement when the fabric wears.

BACKGROUND

Numerous pet chews have been made available to pets. These pet chews may be formed of a variety of materials, such as polymeric materials including edible and non-edible materials, rawhide, rope, etc. They may, for example, bounce, squeak, or ring. Furthermore the chews may provide hygienic or nutritional benefit to the animal.

Exemplary embodiments of pet chews include, for example, but are not limited to the following. "Health Chew Toy," U.S. Pat. No. 6,916,497; "Blends of Starch and Aliphatic-Aromatic Based Polyester Resins," U.S. Pat. No. 6,821,538; "Animal Chew," U.S. Pat. No. 6,274,182; "Heat Modifiable Dog Chew," U.S. Pat. No. 6,180,161; "Method of Molding Animal Starch," U.S. Pat. No. 6,159,516; etc. The prior art is replete with disclosures directed at forming a variety of chew toys. However, there is still a need to provide chew toys that may generally fulfill other or multiple requirements such as retaining the interest of pets and their owners, including various textures in a single chew, or including portions in a chew that may be replaced.

SUMMARY

An aspect of the present invention relates to a chew toy and a method of providing such chew toy. The chew toy may include a base having an interior portion and exhibiting an $E_{flex} \leq 20,000$ psi. A channel may be defined by said interior portion extending through said base. A fabric element may be at least partially located within the channel and extending from the base, wherein the fabric element is retained in the channel by an interference fit with the channel.

BRIEF DESCRIPTION OF DRAWINGS

Features and advantages of the present invention are set forth herein by description of embodiments consistent with the present invention, which description should be considered in conjunction with the accompanying drawings, wherein.

DETAILED DESCRIPTION

The present invention relates to a pet chew toy that includes a fabric element extending from a relatively soft and flexible base. The base may include a channel in which the fabric is located. The fabric may "lock" into the base to prevent the pet from removing the fabric element from the base. The fabric may also be removable from the base for replacement when the fabric portions wear.

Figure 1:
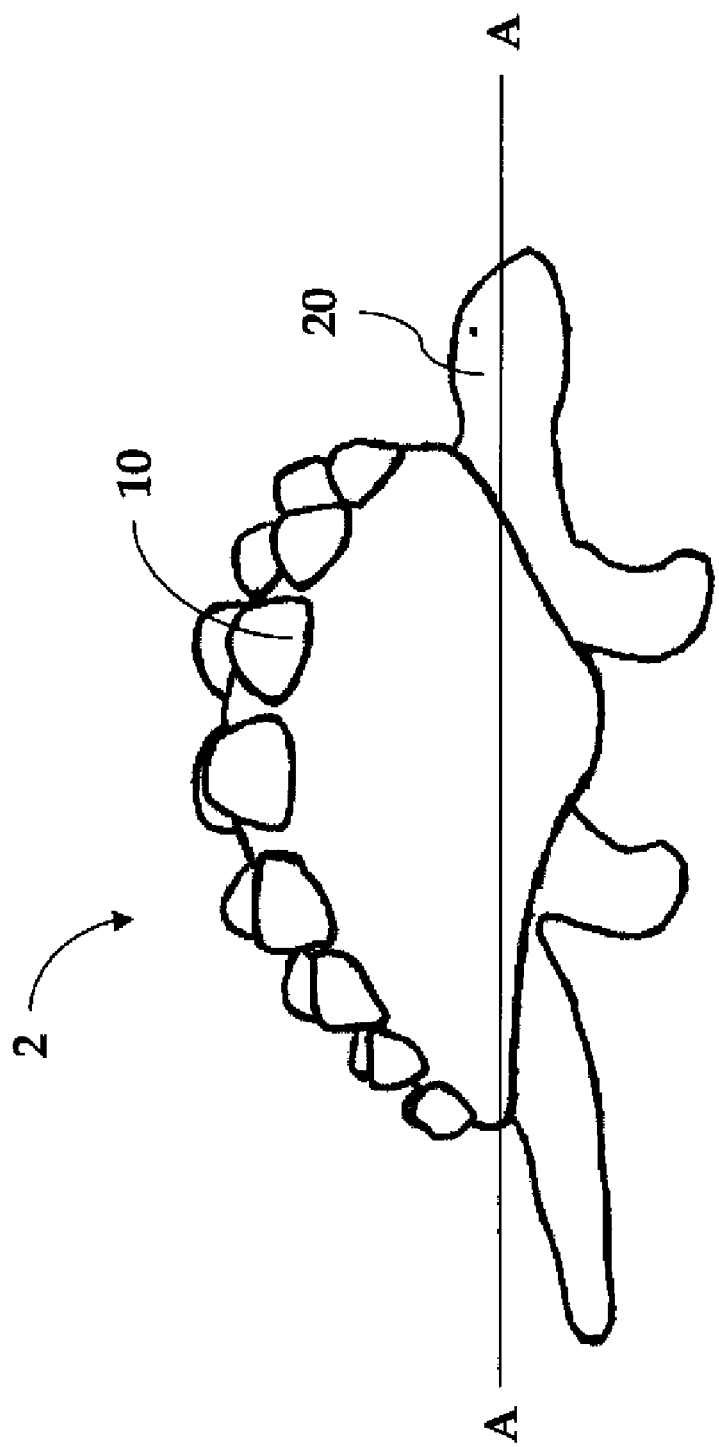
FIG. 1 is a side view of an exemplary embodiment of the present invention.
Figure 2:
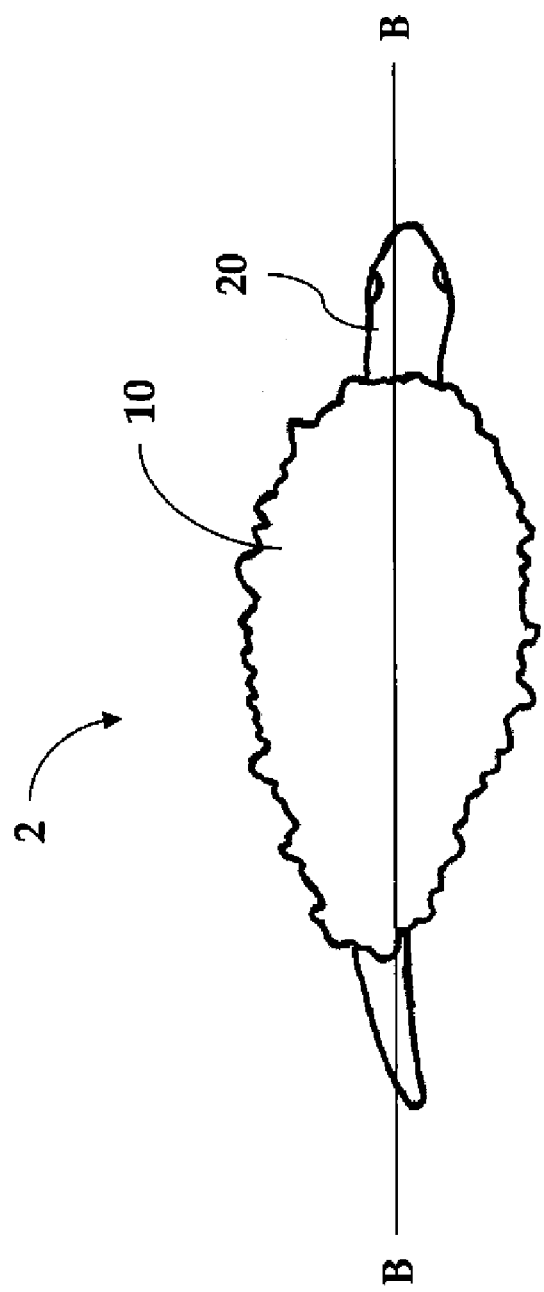
FIG. 2 is a top view of an exemplary embodiment of the present invention.

Illustrated in FIG. 1 is a side view an exemplary embodiment of a pet chew 2, which may assume the shape of a dinosaur, for example, and may include a base 10 and a fabric element 20. FIG. 2 illustrates a top view an exemplary embodiment of the pet chew 2 including the base 10 and fabric element 20. The base 10 may be formed from a number of materials including thermoplastic materials or thermoset materials. The materials may include rubber materials or thermoplastic elastomers. For example, the base material may be formed from polyamide, or polyamide blends and copolymers, polyurethane, latex, natural rubber, synthetic rubber, an edible resin, etc. The base material may comprise a material having a Shore A durometer of less than 70, including all values and increments therein such as 10 to 70. In addition, the base materials may exhibit a flexural modulus $(E_{flex}) \leq 20,000$ psi, including all values and increments therein, e.g. 3 to 5000 psi, etc. However, it may also be the case that the base materials have a $E_{flex}$ of $\geq 50,000$ psi, and may e.g. have a value of between 100,000 psi-500,000 psi, including all individual values and ranges therein.

Edible resins which may be employed as a base material may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2,000 μm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values therebetween such as 40%, 20%, 10%, etc.

The edible resin herein may be sourced from Manildra Group USA, under the following trade names: "GEMSTAR 100," which is a refined food grade wheat starch; "GEMSTAR100+," which is a refined food grade wheat starch; "GEM OF THE WEST VITAL WHEAT GLUTEN," which is a powder product produced by low temperature drying of gluten extracted from wheat flour; "ORGANIC GEM OF THE WEST VITAL WHEAT GLUTEN," which is a powder product produced by low temperature drying of gluten extracted from organic wheat flour; "ORGANIC GEMSTAR 100," which is a wheat starch extracted from organic what flour; and/or "ORGANIC GEMGEL 100," which is a pregelatinized organic wheat starch. In addition, the resin composition may be sourced from ADM under the trade names "EDIGEL 100," which is a wheat resin composition, and "AYTEX P," which is an unmodified food grade wheat starch.

Other edible resins may be contemplated that may be derived from animal sources such as casein, denatured or hydrolyzed casein, collagen, denatured or hydrolyzed collagen, rawhide, gelatin, or other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, thermoplastic materials, and/or thermoset materials.

For example, glutens may be incorporated into the edible resins. Gluten may be understood as water-insoluble protein complex extracted from cereal grains such as maize or corn and wheat. The gluten may be present individually or cumulatively between about 0.1-50% by weight of the resin composition and all increments and values therebetween including 0.1-5.0%, 15%, 25%, etc.

In addition various additives may be incorporated into the edible resins. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the edible resins. The emulsifier may be present between about 1-10% by weight of the resin composition and all increments or values therebetween including 3%, 4%, etc. The emulsifier may include, for example, lecithin, which may be extracted or derived from, for example, egg yolk or soy beans.

The edible resins may also include a plasticizer. The plasticizer may include, for example, glycerin. The plasticizer may be incorporated between about 15-30%, and all increments and values therebetween such as 15%, 21%, 27% etc.

A humectant may also be incorporated into the edible resin composition. The humectant may include, for example, oat fiber. The humectant may be incorporated between about 0.1-5% by weight of the resin composition including all increments and values therebetween, including 1%, 25%, etc. A humectant may be understood to be any additive that may absorb water in the material.

The edible resin composition may also include water. The water may be introduced into the composition between about 1-40% by weight of the edible resin compositions and any increment or value therebetween, including 4%, 20-40%, 10-20%, etc. After the product has been formed, the water may be present between 1-20% by weight of the resin composition including all increments or values therebetween, such as, 20%, 4%, 5-10%, etc.

The edible resin composition may generally include a nutraceutical. The nutraceutical may be fermented soya. Fermented soya nutraceuticals are available from Bio Food, Ltd., Pine Brook, N.J. and sold under the general trade name Soynatto®. The fermented soya is present between about 1-40% by weight of the resin composition, including all increments and values therebetween, including 10%, 20%, etc.

The edible resin composition may also include enzymes and/or co-enzymes which are similarly available through Bio Foods, Ltd., Pine Brook, N.J. and sold under the trade name of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

In addition herbs, herbal extracts, vitamins, minerals, colorants, yeast products, other soy products, etc., may also be incorporated into the edible resin material. Exemplary herbs may include chlorophyll, parsley, mint, etc. Exemplary vitamins may include thiamin, riboflavin, niacin, pantothenic acid, vitamin B-6, folic acid, vitamin A, vitamin E, biotin, choline, inositol, paba, etc. Exemplary minerals may include calcium carbonate, iron carbonate, magnesium oxide, dicalcium phosphate, potassium chloride, sodium selenite, calcium chloride, zinc oxide, copper oxide, manganese oxide, sodium molybdate, etc. Yeast products may include, for example, nutritional yeast or brewers yeast such as *saccharomyces cerevisiae*, dairy yeast such as *kluyveromyce marxianus* or wine yeast such as *saccharomyces fermentati*. In addition, fatty acids such as omega 3-fatty acid and omega-6 fatty acid may be incorporated as well, wherein the omega-3 fatty acid may be incorporated between 0.001 to 1.000% by weight (wt) of the resin.

The base material generally (i.e. the edible resin, thermoplastic, rubber, etc.) may also include a colorant or attractant. The colorants may be any color, such as colors that mimic the flavor of the chew or colors that conform to a given appearance that the chew may assume. The colorant may be added between about 0.01 to 10% by weight (wt) of the base material.

The attractant may be an olfactory stimulant or a flavoring. Exemplary attractants may include the meal or by-products of fish, meat, poultry, etc. In addition, the attractants may include animal digests. By animal digest it is meant to include a substance made by taking relatively clean and relatively undecomposed animal tissue and breaking it down utilizing chemical or enzymatic hydrolysis. The animal digest may include hydrolyzed liver, such as hydrolyzed poultry liver. In addition, the animal digests may not contain hair, horn, teeth, hooves or feathers, but may be present in unavoidable trace amounts. The animal digests may be obtained, for example, from Applied Food Biotechnology Incorporated, O'Fallon, Mo., and sold under the trade name Optimizor®. The attractants may be provided in a number of forms such as liquid or powder. It may also be provided as a concentrate. The attractants may be incorporated into the base material between 0.01 to 5.00% by weight (wt).

Figure 3:
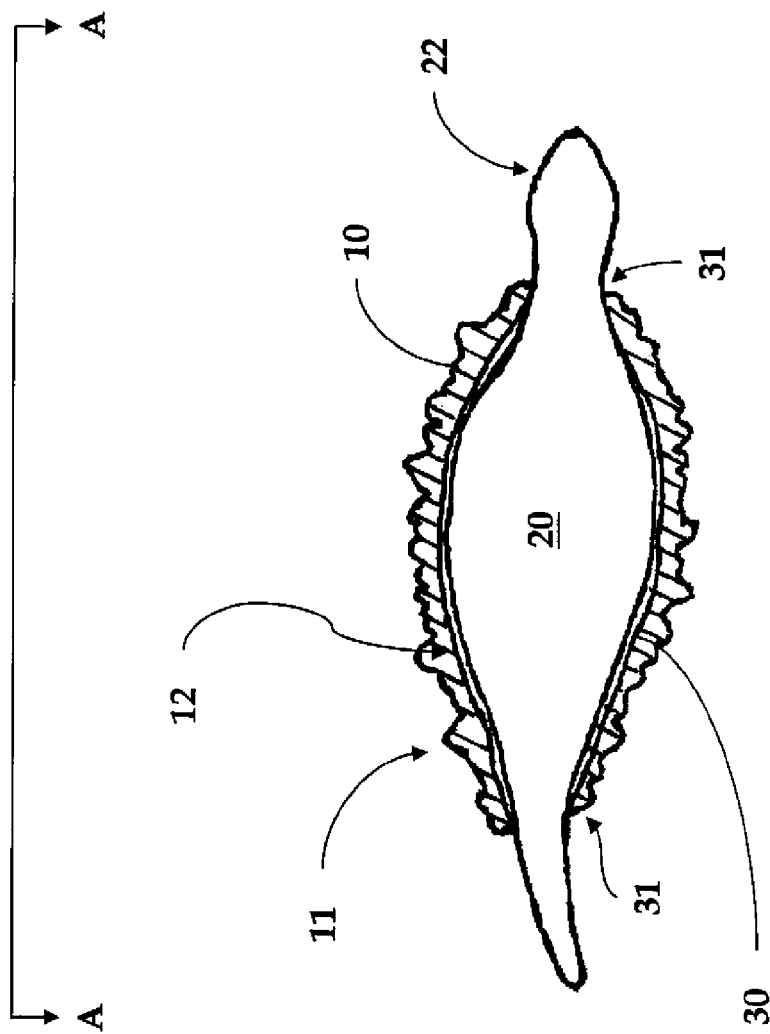
FIG. 3 is a cross-sectional view of FIG. 1 at A-A, illustrating an exemplary embodiment of the present invention.

As illustrated in cross-section view in FIG. 3, along line A-A of FIG. 1, the base 10 may include an exterior surface 11 and an interior surface 12. The interior surface 12 may define one or more channels 30. Each channel may be isolated from other channels or may be interconnected with the other channels when more than one channel is present.

It may be understood that the channels may be elongated which herein refers to a channel that has a length of greater than the diameter of the channel. For example, the elongated channel may have a length "L" that is equal to about 1.25-100 times the diameter "D", including all values and increments therein. Accordingly, the relationship between "L" and "D" in an elongated channel may be expressed as $L=x \cdot D$ wherein x has a value in the range of 1.25 to 100. The fabric element 20 may be passed through the channel 30, wherein one or more projections 22 of the fabric element 20 may extend outwardly from the channel 30 and base 10 proximate to end portions 31 of the channel 30.

Figure 4:
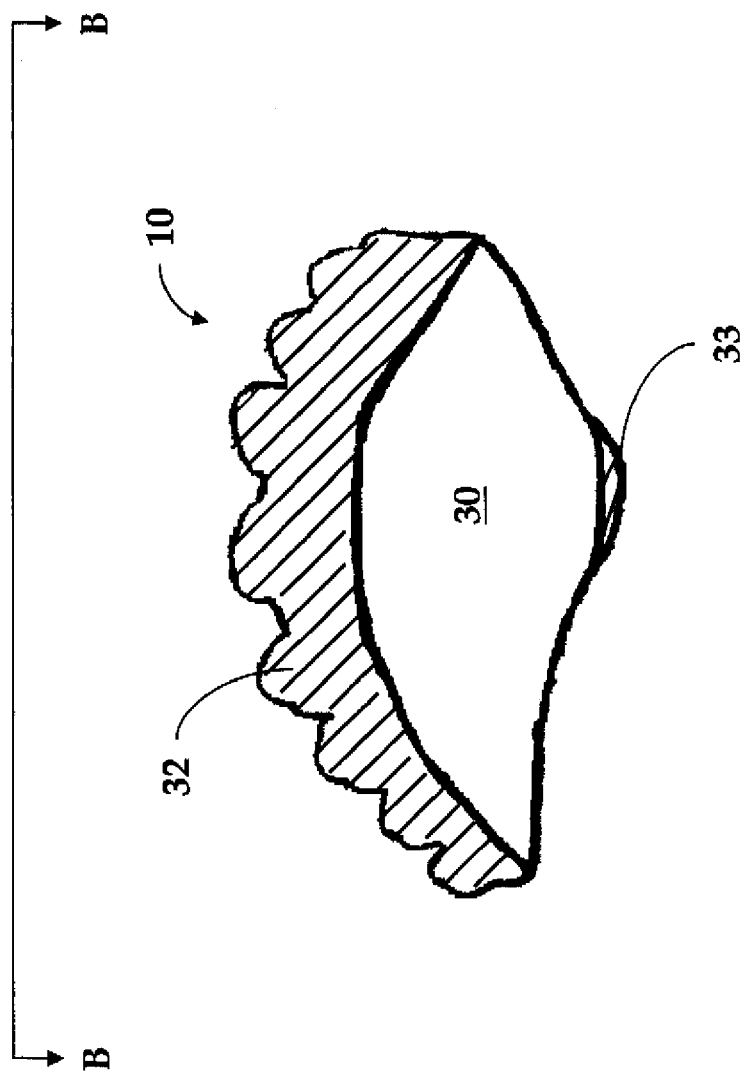
FIG. 4 is a cross-sectional view of FIG. 2 at B-B, illustrating another exemplary embodiment of the present invention.
Figure 5:
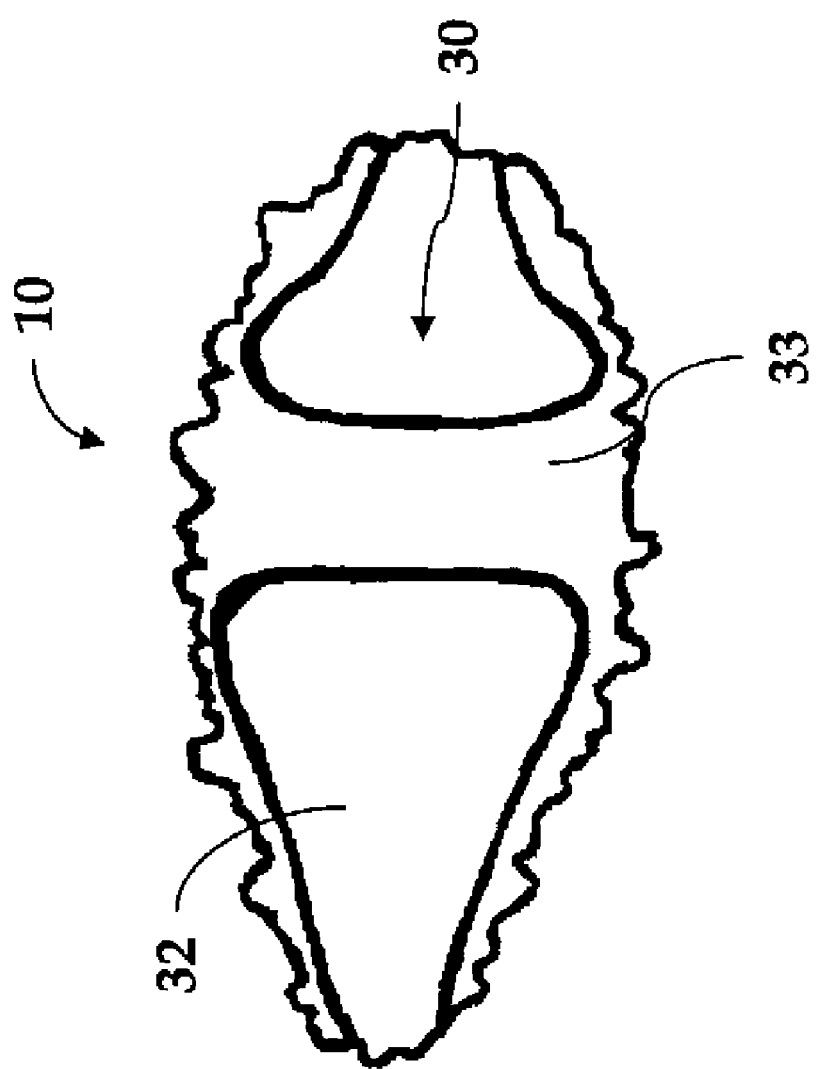
FIG. 5 is a bottom view illustrating another exemplary embodiment of the present invention.

The channel may also be asymmetric, that is non-uniform in shape. FIG. 4 is cross-sectional side view along line B-B in FIG. 2 illustrating a base 10 of an exemplary chew toy wherein the channel 30 may be asymmetric. As illustrated, the upper portion 32 of the base 10 forming the channel may be much larger and extend past the lower portion 33 of the base forming the channel 20. FIG. 5 is a bottom view of the same exemplary channel 30 illustrating the projecting upper portion 32 and lower portion 33 forming the channel 30.

Figure 6:
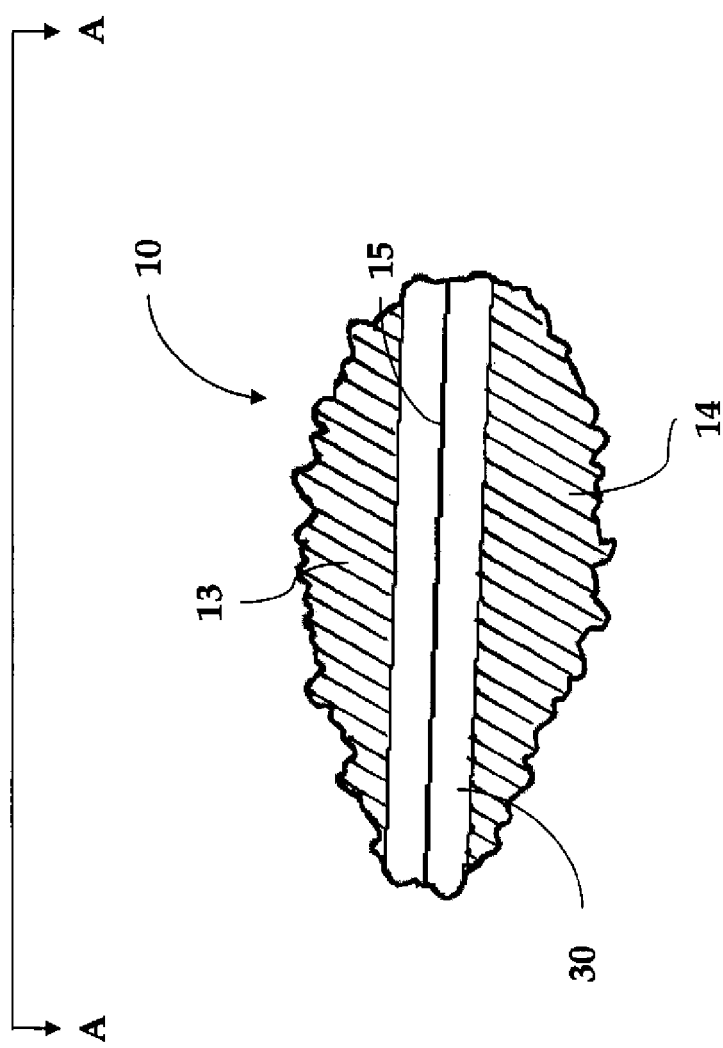
FIG. 6 is a cross-sectional view of FIG. 1 at A-A, illustrating another exemplary embodiment of the present invention.

It should therefore be appreciated that the base 10 and fabric elements 20 may assume the shape of a number of objects, including a dinosaur, as illustrated, or other figures such as geometric figures, people figures, or animal figures, such as a crab, a turtle, a lobster, etc. The base may be one integral formed component of unitary construction. In addition, the base 10 may be formed by one or more components. For example, as illustrated in FIG. 6, which is another cross-sectional view along line A-A in FIG. 1, the base 10 may include a first component 13 and a second component 14. However, more than two components may also be employed, such as three components, four components, etc. Where two or more components meet, a parting line 15 may be present. The channel 30 may pass through the base 10 along the parting line 15, as illustrated in FIG. 6, or may pass through the base at an angle or perpendicular to the parting line 15.

The base 10 may be formed by melt processing. Melt processing may be understood herein to include any form of processing where a material is caused to flow and form. Processes contemplated, therefore include, but are not limited to, injection molding, blow molding, rotary molding, extrusion, co-extrusion, over-molding, etc. It should be appreciated that the starting resins or materials may be in solid form, converted as necessary to flow, or in liquid form.

As alluded to above, the base may also include a single unitary component and may be formed by processing techniques that allow for one or more channels to be produced in the base. For example, a number of injection molding techniques, including lost core molding, die-slide molding, gas assist injection molding, expandable/retractable core technology etc., may be employed. In addition, the base may be extruded, rotary molded, co-extruded or blowmolded.

The base may also be formed using a single component that incorporates a hinge portion, wherein the component may be folded onto itself, similar to a clamshell, and secured. Methods of securing the component may include mechanical fasteners, snap fits, press fits, interferences, welding including ultrasonic welding, heat staking, adherents or solvent bonding. The base may be secured in a manner so as to allow the base to be re-opened when it is desirable, such as to replace the fabric elements.

Where a base may include more than one component, the components may each be formed through any number of melt-processing techniques such as injection molding, extrusion, rotary molding, etc. The components may be assembled into the base by techniques including snap fits, welding including ultrasonic welding, heat staking, etc. Methods of securing the components may include mechanical fasteners, snap fits, press fits, interferences, welding including ultrasonic welding, heat staking, adherents or solvent bonding. The components of the base may be secured using one or more methods. Furthermore, the base may be secured so that the base may be re-opened as desired, such as to replace the fabric elements.

Turning to the fabric element 20, the material used in the fabric element 20 may be, for example, a polymeric or natural fiber fabric that may be woven, non-woven or knit. Accordingly, the fabric may be, for example, canvas. In addition, the fabric may be formed having an open structure, wherein small perforations or holes of varying sizes may be formed in the fabric. Furthermore, the fabric may include a polymeric material that may be fiber forming. The fibers may be composed of, for example, aramid fiber (e.g., KEVLAR™), acrylic fiber, modacrylic fiber, polyamide fiber, olefin fiber, polyethylene fiber, naphthalate fiber, polyester fiber (PET), or combinations thereof. In an exemplary embodiment, the fibers may be composed of extended chain and orientated polyethylene fiber (e.g., SPECTRA™ polyethylene fiber material, available from Honeywell). Such oriented polyethylene fiber is reportedly based upon relatively high molecular weight polyethylene sourced from a gel-spinning process, thereby producing polyethylene fibers with a melting point of about 150° C. Such fibers are, e.g., characterized as having an ultimate tensile strength of about 2.1 GPA and higher, a modulus of about 60 GPa and higher and a density of about 0.97 g/cc. Accordingly, such fibers may be light weight and have good resistance to abrasion. SPECTRA fibers used may include, for example, SPECTRA 900, SPECTRA 1000 or SPECTRA 2000.

Figure 7:
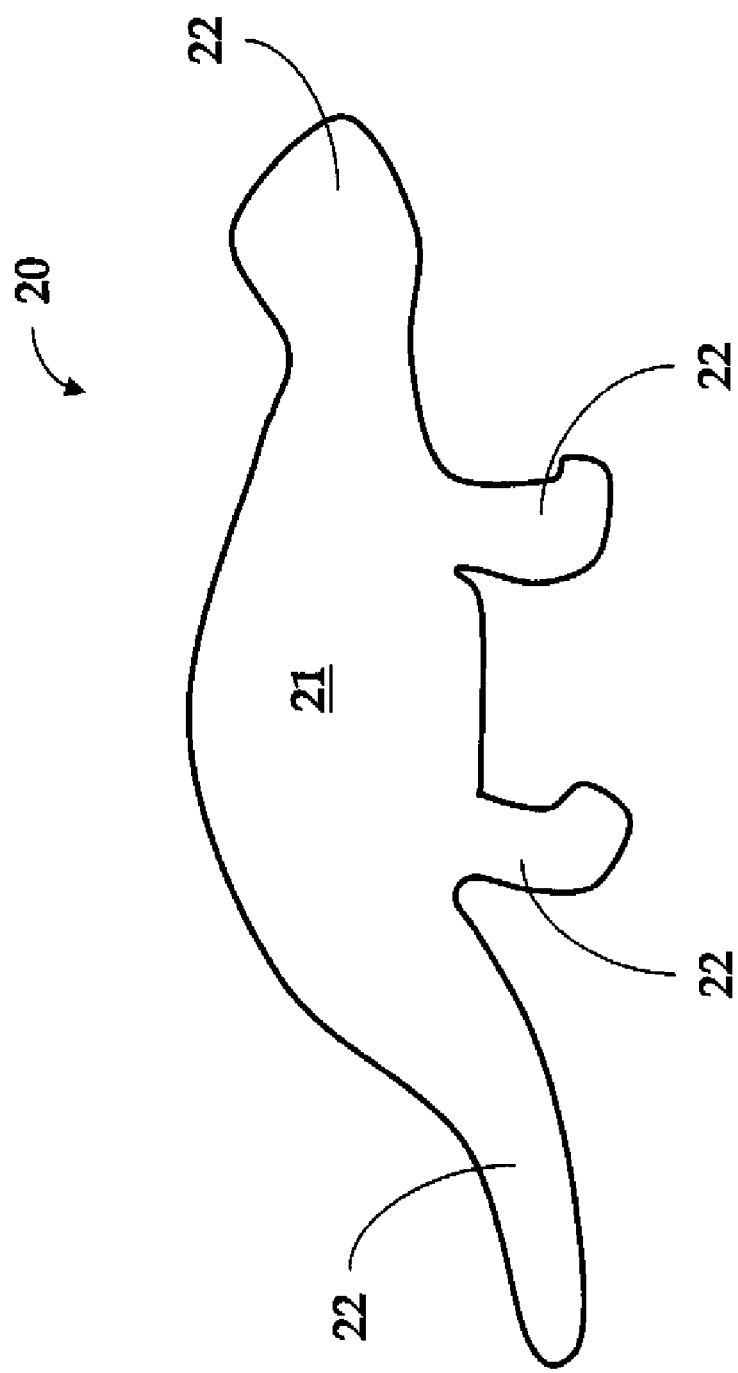
FIG. 7 is a side view of an exemplary embodiment of a fabric element of the present invention.
Figure 8:
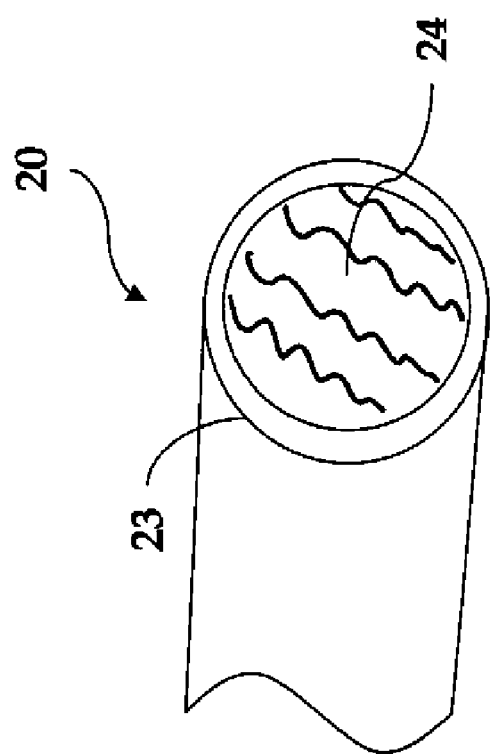
FIG. 8 is a view of the fabric element including a cavity containing stuffing.

FIG. 7 illustrates that a fabric element 20 may be formed into a desired shape, such as shapes complementary to the base 10 to form a desired figure. Accordingly, as alluded to above, the fabric element may include a main body 21 and projections extending from the main body which may assume the shape of various features, e.g. legs, head, tail, of the fabric element 20. The fabric element 20 may be shaped via impregnation with a polymer material and forming or curing the impregnated fabric into a desired shape, thermo-mechanically deforming the fabric fibers, or welding or stitching the fabric into desired shapes. As illustrated in FIG. 8, the fabric element 20 may also include an outer layer 23 forming a cavity. The cavity may contain stuffing material 24. The stuffing material may include, for example, a non-woven bat, edible resinous material, foam material, polymeric material, rubber material, etc.

In addition, the fabric element may also contain and be impregnated with a flavoring or attractant, such as those discussed above. The attractant may also be applied directly to the fabric. In addition, the fabric, or fibers used in forming the fabric, may be impregnated with the flavoring such by adding the flavoring to a solution containing a binder material and coating the fabric in the solution. The solution may be an aqueous based solution and the binder material may be any suitable material such as carbohydrate based materials or polymer latexes that may penetrate and/or adhere to the fabric. Where the fabric may be formed from a thermoplastic resin material, the fabric may be impregnated with the flavoring by compounding the flavoring into the resin material prior to forming the resin into fibers.

Figure 9:
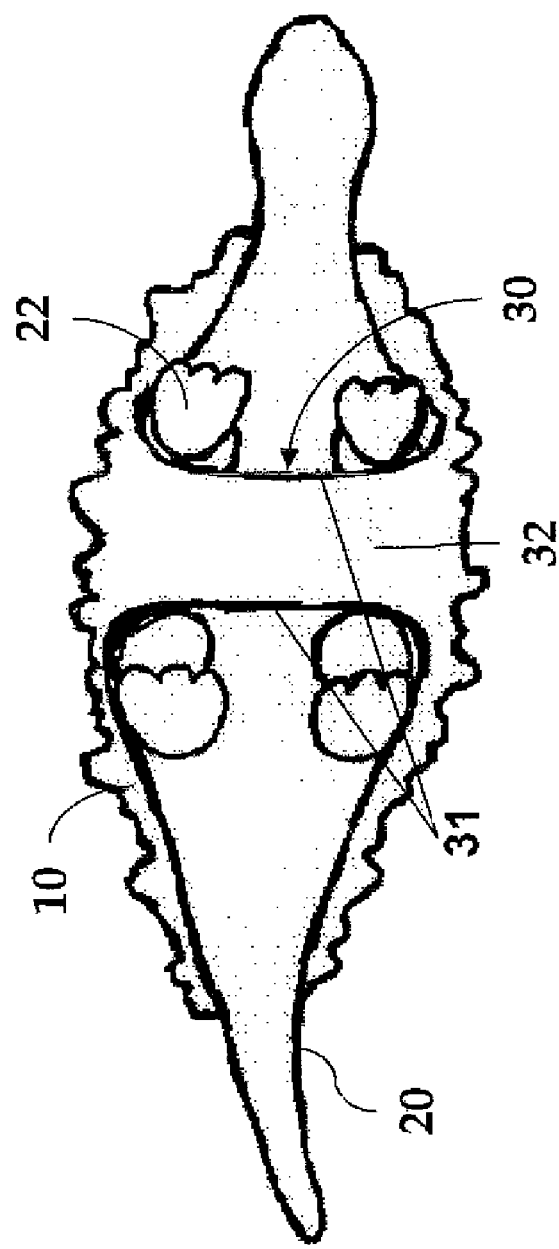
FIG. 9 is a bottom view of an exemplary embodiment of the present invention.
Figure 10:
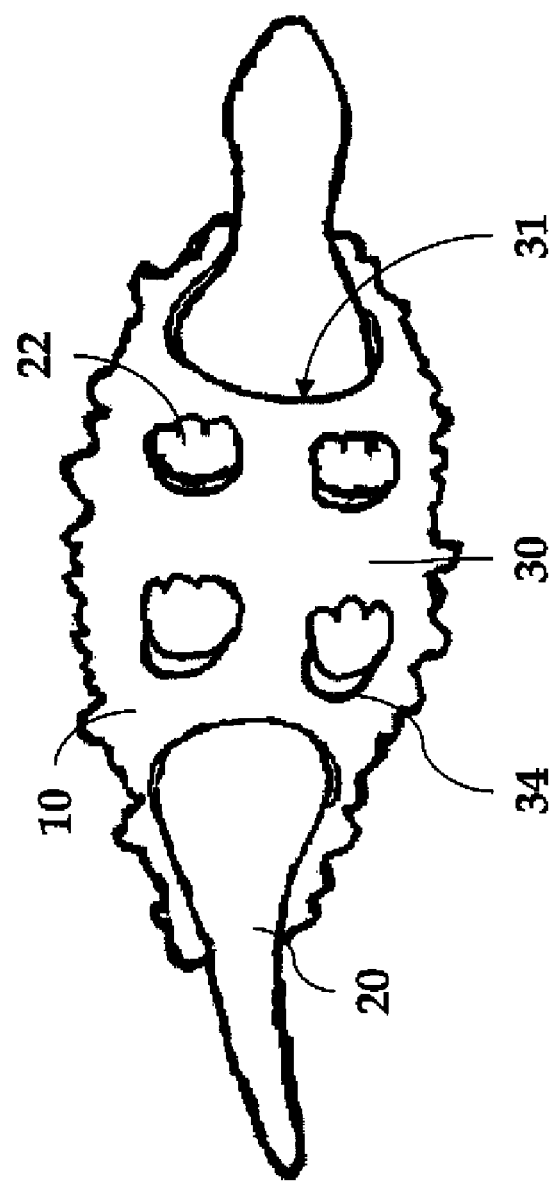
FIG. 10 is a bottom view of an exemplary embodiment of the present invention.
Figure 11:
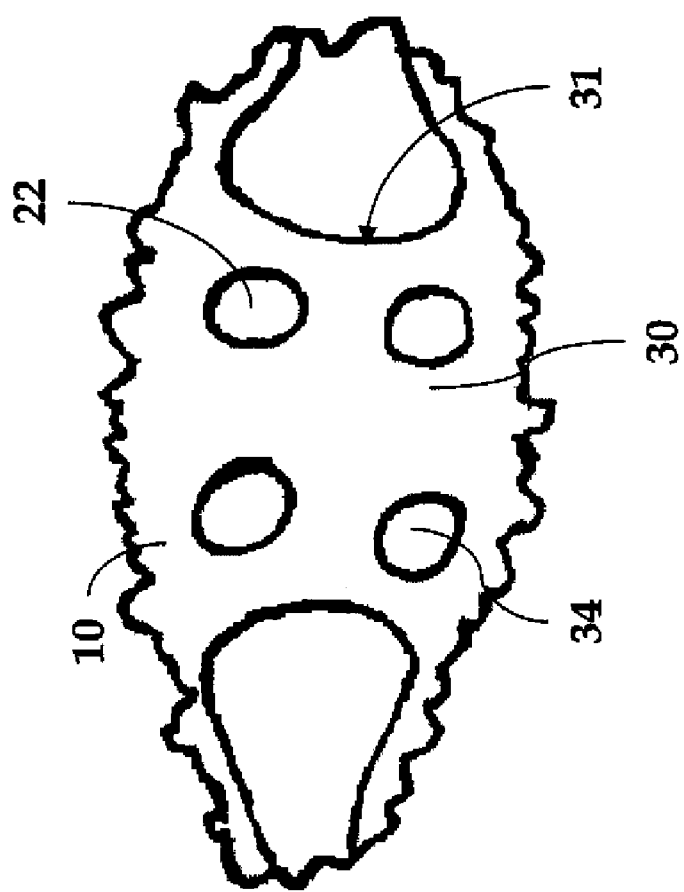
FIG. 11 is a bottom view of an exemplary base of the present invention.

FIG. 9 illustrates an exemplary embodiment of the bottom view of an assembled chew toy. As can be seen from the FIG. 9, the various projections 22 extending from the fabric element 20 may be positioned past the end portions 31 of the channel 30. In addition, as illustrated in bottom view of FIG. 10 of another exemplary embodiment, the projections 22 extending from the fabric element 20 may be passed through or retained in the base 10 such that the projections 22 of the fabric element 20 project outwardly from the base 10 through one or more openings 34 in the channel 30 wall. FIG. 11 illustrates a bottom view of the base 10, without the fabric element 20, containing a number of openings 34 in the channel 30. Therefore, once the projections 22 have been pulled through or retained in the openings 34, the projections 22 may create a locking or interference relationship with the base 10.

Figure 12:
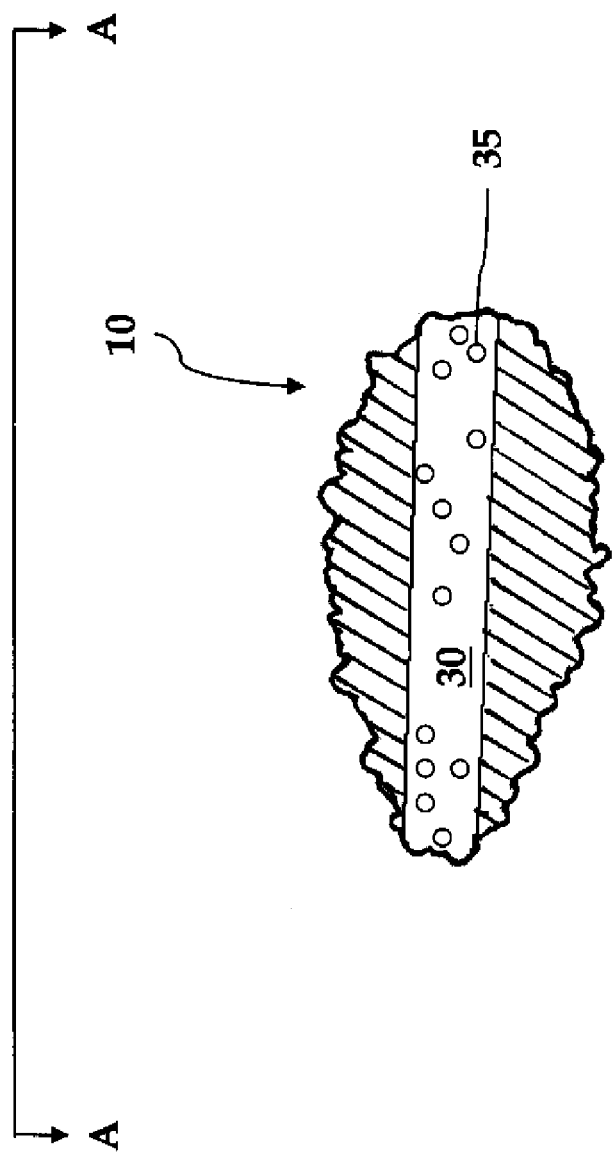
FIG. 12 is a cross-sectional view of FIG. 1 at A-A illustrating another exemplary embodiment of the present invention.
Figure 13:
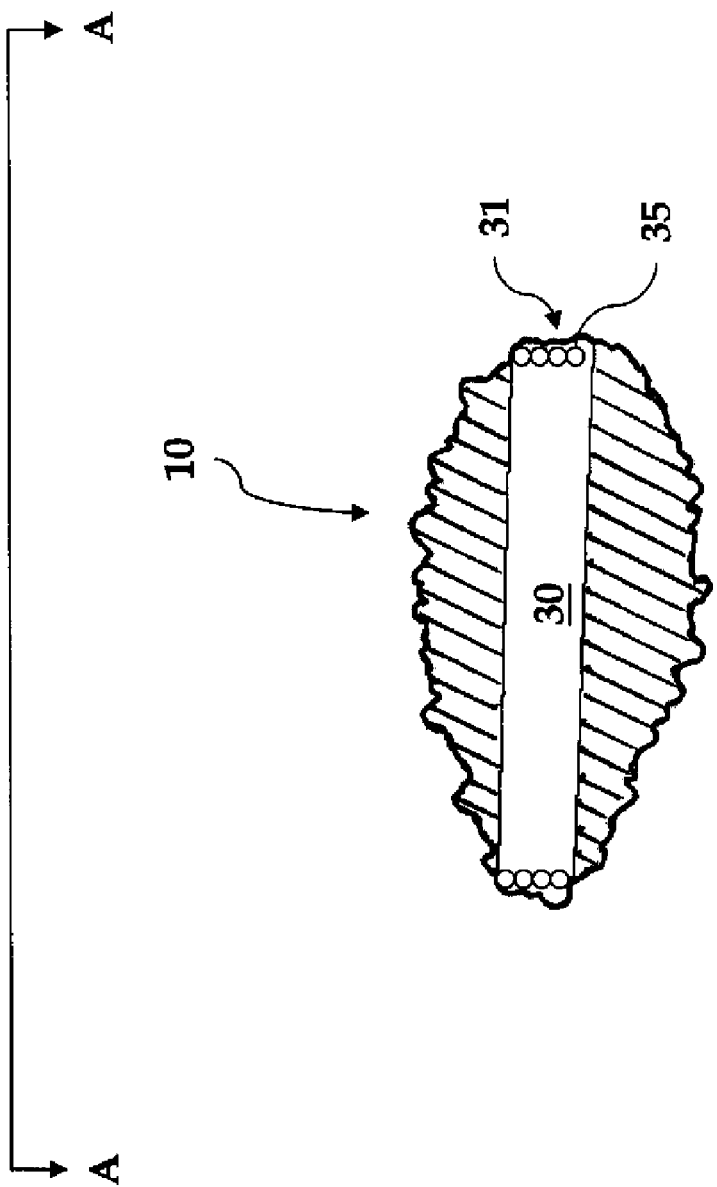
FIG. 13 is another cross-sectional view of FIG. 1 at A-A illustrating another exemplary embodiment of the present invention.
Figure 14:
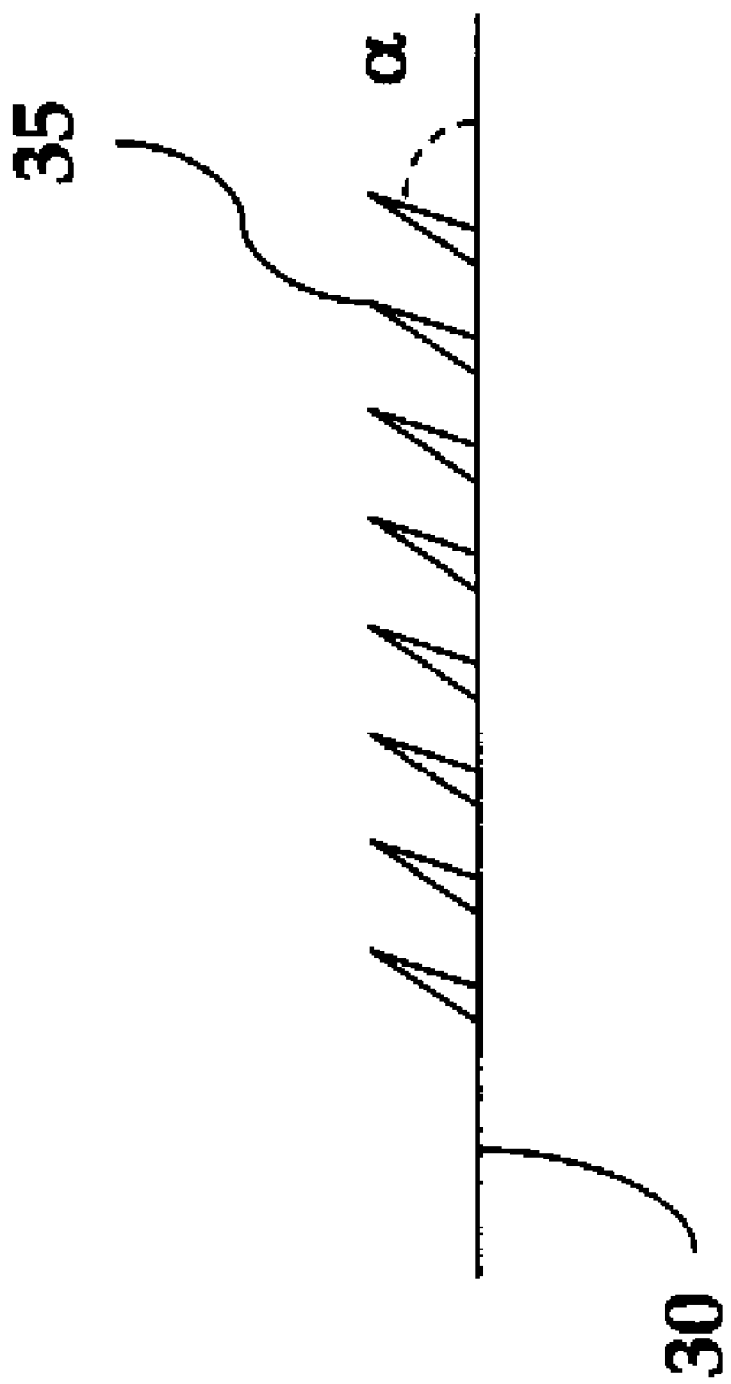
FIG. 14 is a side view of an exemplary embodiment of retention features located within a channel.

Various other locking or interference mechanisms may be provided between the base 10 and the fabric element 20. As shown in FIG. 12, a channel 30 in the base 10 may include retention features 35 for retaining a fabric element 20 (not illustrated) in the base 10 in a substantially locking relationship. For example, one or more retention features 35, such as hooks, spikes, nubs or a combination thereof, may protrude from the surfaces defining the channel 30. The retention features 35 may also be placed to a greater degree at the channel opening 31 (or end portions of the channel) as illustrated in FIG. 13, as opposed to on the surfaces defining the channel 30. Furthermore, as illustrated in FIG. 14, the retention device 35 may be placed at an angle $\alpha$ from the channel wall 30. It should be appreciated that each retention device 35 may be placed at the same or different angle $\alpha$.

Figure 15:
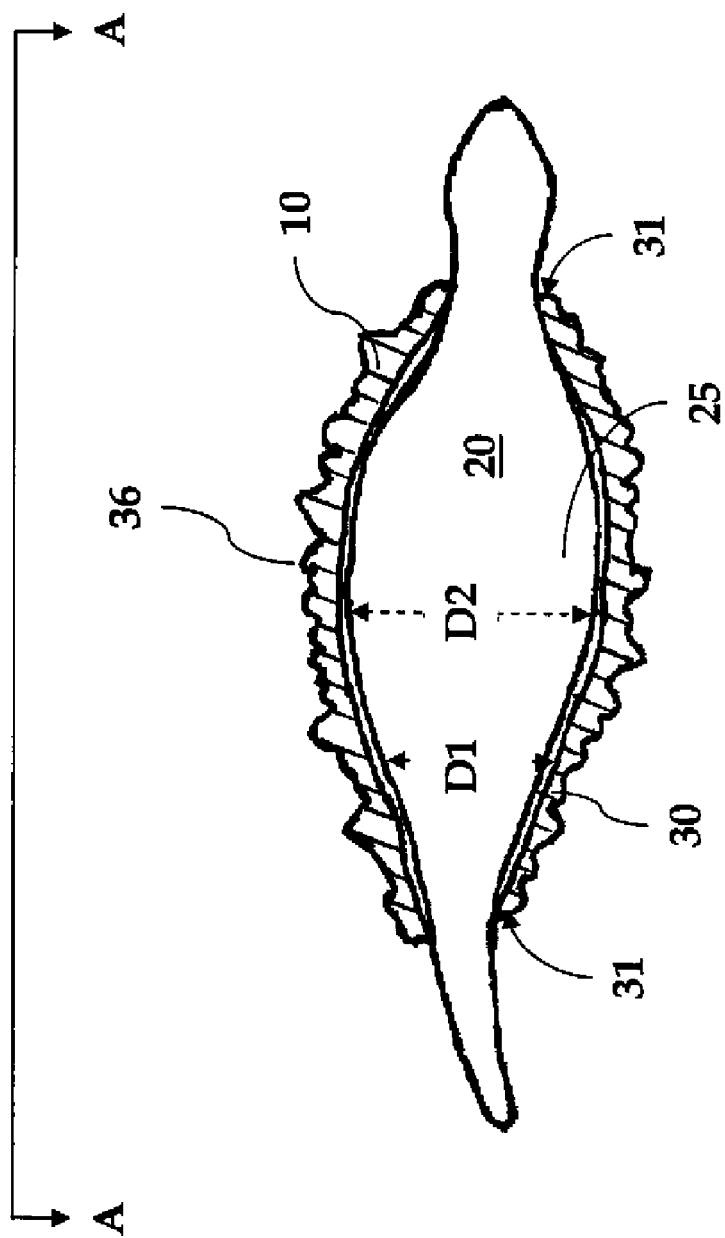
FIG. 15 is a cross-sectional view of FIG. 1 at A-A illustrating another exemplary embodiment of the present invention.

In addition, as illustrated in FIG. 15, a cross-sectional view of the chew toy at A-A of FIG. 1, an expanded portion 25 may also be present in the fabric element 20 which may be passed through or secured in a channel 30 and retained within the channel 30. The channel 30 may include a central portion 36 that may generally have a larger diameter D2 than the end portions 31 of the channel D1. Note that, as illustrated the diameter smoothly transitions from the larger diameter D2 to the smaller diameter D1; however it is also contemplated that the diameters may transition at specific locations and not as gradually as illustrated. Thus the fabric element 20 may be retained in the channel 30 by the interference of the expanded portion 25 with the portion of the channel 30 having a reduced channel diameter D1. The central portion 36 may be located anywhere between two end portions 31, or end and intersecting portions, of a given channel.

Accordingly, in providing a pet chew of the present invention, one may form the base portion 10 using a number of molding methods and then insert the fabric element 20 into the base portion 10. In an exemplary embodiment, the fabric element 20 may be inserted into the pet chew 2 and then stuffing may be inserted into a cavity formed by the fabric element. A sufficient amount of stuffing may be provided to create interference between the base 10 and the fabric element 20, preventing the filled fabric element 20 from being pulled from the base 10. Accordingly, the portion of the fabric element located within the channel 30 of the base 10 may be larger volumetrically than the volume of the channel prior to stuffing. For example, the fabric element may be 1-20% larger volumetrically than the interior volume of the channel, including all ranges and values therein. Once the cavity of the fabric element is stuffed, the channel may be stretched. The force provided by the stuffing against the base 10 may be in the range of 1 and 100 psi, including all values and increments therein.

In another exemplary embodiment, the base portion 10 of the pet chew may be stretched to accommodate an already stuffed fabric element 20. The interior volume of the channel may be expanded 1-20%, including all ranges and increments therein, by mechanical stress or thermal stress and the fabric element may be passed through the expanded channel. Once the stress causing expansion of the channel is released, the channel 30 may form a tight contacting fit with the fabric element 20.

In addition, the fabric element 20 may be located within a mold and the base 10 may be molded around the fabric element 20. It is also contemplated that prior to complete cooling and shrinkage of the base 10, the fabric element 20 may be presented within the channel 30 and the base 10 may cool and shrink around the fabric element 20.

The foregoing description is provided to illustrate and explain the present invention. However, the description hereinabove should not be considered to limit the scope of the invention set forth in the claims appended here to.

What is claimed is:

1. A chew toy comprising:
    a hollow base consisting of a molded unitary monolithic component having an interior volume and exhibiting an $E_{flex} \leq 20,000$ psi;
    a channel defined by said interior volume extending through said base and having a length (L) and a diameter (D), said diameter less than said length;
    a woven, non-woven or knit fabric element inserted in said hollow base, the fabric element including a main body and one or more projections extending from said main body, said main body of said fabric element having a shape complementary to said interior volume and retained in said interior volume by an interference fit;
    said hollow base further including one or more openings, said one or more projections extending outwardly through said one or more openings;
    wherein said main body of said fabric element has a volume and said volume is 1-20% greater in volume than said interior volume and wherein said fabric forms a cavity and stuffing is retained in said cavity, wherein said stuffing is selected from one of a non-woven bat, edible resinous material, foam material, polymeric material or rubber material.

2. The chew toy of claim 1 wherein said base has an $E_{flex}$ of between about 3-5,000 psi.

3. The chew toy of claim 1 wherein said base has a Shore A Hardness of $\leq 70$.

4. The chew toy of claim 1 wherein L=x·D wherein x has a value of about 1.25 to 100.

5. The chew toy of claim 1 wherein said base is formed from a material and said material includes an attractant.

6. The chew toy of claim 1 wherein said fabric is impregnated with an attractant.

* * * * *